Feb. 7, 1933. H. SCHWEITZER 1,896,123
WAX DENTAL FORM AND METHOD OF MAKING SAME
Original Filed July 29, 1925
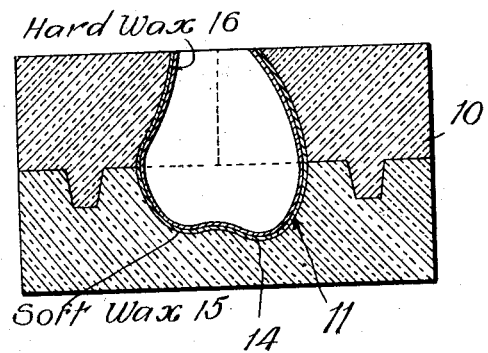
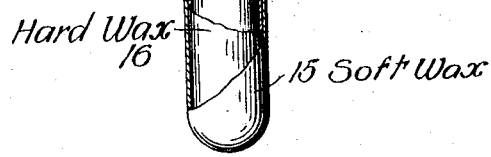
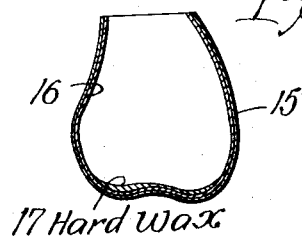
Inventor
Hinrich Schweitzer
by
Warren S. Orton
Attorney Patented Feb. 7, 1933

1,896,123

UNITED STATES PATENT OFFICE

HEINRICH SCHWEITZER, OF NEW YORK, N. Y.

WAX DENTAL FORM AND METHOD OF MAKING SAME

Original application filed July 29, 1925, Serial No. 46,757. Divided and this application filed June 13, 1928. Serial No. 285,075. Renewed June 20, 1932.

The invention relates in general to a method of manufacturing dental patterns and forms, such as backings, sprue forms, shells and crowns, when made of dental wax or similar moldable material and the present application constitutes a division of my pending application Serial No. 46,757 filed July 29, 1925.

Forms and patterns of this character are usually made from a composition of beeswax, rosin, paraffin and other soluble bodies and are made of two degrees of hardness or rigidity, one type generally known as soft dental wax having a higher percentage of beeswax than the other type identified as hard dental wax.

The use of soft dental waxes for making such forms has certain advantages for the forms made therefrom are pliable at normal room temperatures; they do not break easily; they are adhesive and sticky, but are not very rigid. The formers made from the hard dental wax have the advantage in that they are easily curved upon the surface and while they are brittle, they are also rigid at normal temperature; do not bend and are non-adhesive.

The primary object of the present invention is to provide a simple method for manufacturing a dental form which will combine in one article all of the advantages inherent in such articles when made heretofore separately of hard and soft dental waxes.

Broadly, I attain this phase of the invention by forming a shell of soft wax and imposing thereon a similar thin shell of hard wax and permitting the same to adhere integrally to form a shell of the desired configuration.

Various other objects and advantages of the invention will be in part obvious from a consideration of the method features of the disclosure and from an inspection of the accompanying drawing, and in part will be more fully set forth in the following particular description of one method of practicing the invention and in the inspection of one form of mold and two forms of wax shells embodying certain structural features of my invention, and the invention also consists in certain new and novel modifications of the preferred methods and other features of construction and combination of parts hereinafter set forth and claimed.

In the accompanying drawing:—

Figure 1 is a vertical sectional view of a cavity or female mold of conventional form illustrating an instrumentality by means of which the method herein featured may be practiced and illustrating in axial section one physical embodiment of the article feature of the disclosure;

Figure 2 is a view in side elevation of a male mold showing formed therein another embodiment of the article feature of the disclosure; and Figure 3 is a view partly in side elevation and partly in section of a wax form constituting a modification of the form shown in Figure 1.

In the following description and in the claims, parts will be identified by specific names for convenience of expression but they are intended to be as generic in their application to similar parts as the art will permit.

In the drawing and referring particularly to Figure 1 there is shown a multi-section crown tooth mold 10 of conventional configuration having a cavity 11 of the configuration desired of the final wax form and which mold will be referred to specifically hereinafter as a female mold in order to distinguish from the cylindrical plunger 12 constituting a male form for forming cylindrical shaped wax crowns as shown in Figure 2.

The wax form herein featured may be formed following either one of two methods. By the first method the wall 14 of the cavity is wetted and liquid soft wax is introduced into the cavity completely filling the same and immediately the mold is inverted so as to pour therefrom all of the fluid wax which has not in the meantime adherred to and crystallized on the outlining wall 14 of the cavity. There will be left in the mold an extremely thin, soft, set wax layer 15. There is then introduced into the cavity 11 or rather into the space formed by the shell forming layer 15, liquefied hard wax again filling the cavity and again the liquid wax is promptly poured from the mold. This leaves an inner hard wax layer 16 adherring to and integrally connected to the outer soft wax layer 15. The parts of the molds are separated and the form removed. There is thus produced a thin wall two-layer wax shell with the layers having different degrees of hardness. It is obviously within the scope of the disclosure to multiply the number of layers preferably alternating with soft and hard wax so that there is eventually formed a multi-layer wax shell of any degree of thickness. The thickness of each layer is controlled by the composition of the wax, by the temperature of the same and by the speed at which the operator works in introducing and discharging the wax.

By the second method it is suggested that the male mold 12 previously wetted, be dipped first into a pool of liquid hard wax to form an inner hard wax layer 16, promptly withdrawn from the same to permit the surplus wax to drain therefrom; after which the coated mold is dipped into a pool of liquid soft wax, promptly withdrawn and drained. In the illustrated case the male mold is cylindrical so that the resulting shell will be of the conventional closed end cylinder form and differs from the conventional form in that it includes two layers of wax, the hard inner layer 16 and a soft outer layer 15. The shell thus formed can be inserted into a mold of the type shown in Figure 1 and by fluid pressure exerted on the interior of the shell, it can be expanded into engagement with the wall 14 so as to take the configuration of the cavity formed by such wall.

Instead of coating all parts of the shell uniformly with its succeeding layers of soft and hard wax certain localized portions may receive an extra layer of either form of wax and as one illustration of such modification reference is made to Figure 3 where a limited amount of hard wax is introduced to form an additional layer 17 which is confined to the cusp portion of the tooth and thus provides an extra strong reinforcement for this portion of the tooth.

While I have shown and described, and have pointed out in the annexed claims, certain novel features of my invention, it will be understood that various omissions, substitutions and changes in the form and details of the device illustrated and in its operation may be made by those skilled in the art without departing from the spirit of the invention.

I claim:

1. In the art of forming wax dental forms, the method which consists in wetting the wall of the cavity in a mold, filling the same with liquid soft wax, and immediately pouring from the mold cavity all the wax which will flow therefrom, leaving a soft thin wax shell in contact with the outlining wall of the mold, pouring into the wax shell so formed and while retained in the mold, a second filling comprising a hard liquid wax, thereby to cause the two wax layers to adhere to and integrally connect each other, promptly removing all hard wax not adhering to the first soft wax shell and removing from the mold the composite two-layer shell so formed.

2. In the art of forming wax dental forms, the method which consists in wetting the wall of the cavity in a mold, filling the same with liquid soft wax, and immediately pouring from the mold cavity all the wax which will flow therefrom, leaving a soft thin wax shell in contact with the outlining wall of the mold, pouring into the wax shell so formed and while retained in the mold, a second filling comprising a hard liquid wax, thereby to cause the two wax layers to adhere to and integrally connect each other, promptly removing all hard wax not adhering to the first soft wax shell, introducing into the bottom of the second filling an amount of wax sufficient to cover the bottom of said second filling but not sufficient to fill the shell formed by said second filling, thereby to provide a local reinforcement to the cusp portion of the completed shell and removing from the mold the composite multi-layer shell so formed.

Signed at New York in the county of New York and State of New York this 6th day of March A. D. 1928.

HEINRICH SCHWEITZER.